(12) United States Patent
Tourigny

(10) Patent No.: US 7,685,668 B2
(45) Date of Patent: Mar. 30, 2010

(54) ARTICLE FOR CLEANING OPTICAL FIBERS

(75) Inventor: Jay S. Tourigny, Collinsville, CT (US)

(73) Assignee: Zynon Technologies, LLC, New Britain, CT (US)

( * ) Notice: Subject to any disclaimer, the term of this patent is extended or adjusted under 35 U.S.C. 154(b) by 160 days.

(21) Appl. No.: 12/101,427

(22) Filed: Apr. 11, 2008

(65) Prior Publication Data

US 2008/0184513 A1    Aug. 7, 2008

Related U.S. Application Data

(62) Division of application No. 10/423,293, filed on Apr. 25, 2003, now Pat. No. 7,401,374.

(60) Provisional application No. 60/375,649, filed on Apr. 26, 2002.

(51) Int. Cl.
 *A47L 25/00* (2006.01)
 *B08B 11/00* (2006.01)

(52) U.S. Cl. ............ 15/104.001; 15/244.1; 15/210.1; 15/104.05; 15/244.4; 385/78

(58) Field of Classification Search ......... 15/104.05, 15/104.001, 104.16, 210.1, 209.1, 244.1–244.4; 385/78, 84, 85, 134, 137, 147; 428/316.6, 428/310.5; 118/264
See application file for complete search history.

(56) References Cited

U.S. PATENT DOCUMENTS

| | | | |
|---|---|---|---|
| 2,294,186 A | 8/1942 | Kirschbaum |
| 2,501,289 A | 3/1950 | Orndorff |
| 3,118,163 A | 1/1964 | Abberly |
| 3,570,036 A | 3/1971 | Gilchrist et al. |
| 3,694,845 A | 10/1972 | Engelsher |
| 3,971,315 A | 7/1976 | Hansen |
| 4,232,128 A | 11/1980 | Michel et al. |
| 4,866,806 A | 9/1989 | Bedford |
| 5,325,452 A | 6/1994 | Stein et al. |

(Continued)

OTHER PUBLICATIONS

International Search Report for PCT/US03/13083, mailed Jul. 23, 2003, 3 pages.

(Continued)

*Primary Examiner*—Laura C Guidotti
(74) *Attorney, Agent, or Firm*—Cantor Colburn LLP

(57) ABSTRACT

A cleaning device for cleaning the ferrule end surface of an optical fiber that has been installed in a connector, such as a connector coupler or bulkhead receptacle, comprises a cleaning head (22a, 22b, 22c). The cleaning head is made from thermally sintered polymers, e.g., thermally sintered particles and/or thermally sintered strands and provides a matrix of open-celled multi-directional pores. The cleaning head has zones (26, 28, 32) of increasing polymer densities from compression zone (26) to sidewall cleaning zone (28) to base zone (32). The cleaning head serves to lift, absorb, trap and remove contamination from the ferrule end faces (14a, 14b, 14c) and the end face of the optical fiber therein. The open-celled structure of the cleaning head (22a, 22b, 22c) allows the contact surface to compress both laterally and radially where it contacts the ferrule end, thus permitting effective cleaning for all ferrule end designs. The cleaning head may be used either dry or with a cleaning solvent.

20 Claims, 3 Drawing Sheets

U.S. PATENT DOCUMENTS

| | | |
|---|---|---|
| 5,557,696 A | 9/1996 | Stein |
| 5,925,191 A | 7/1999 | Stein et al. |
| 5,980,799 A | 11/1999 | Martakos et al. |
| 6,374,030 B2 | 4/2002 | Krow, Jr. et al. |
| 6,436,426 B1 | 8/2002 | Liao et al. |
| 6,485,193 B1 | 11/2002 | Chandraiah et al. |
| 6,485,822 B1 * | 11/2002 | Osiecki et al. ........... 428/316.6 |
| 6,565,265 B2 | 5/2003 | Ohtsuka et al. |
| 6,758,605 B1 * | 7/2004 | Villemaire et al. ............ 385/85 |
| 6,807,705 B2 | 10/2004 | Piombini |
| 6,810,552 B2 | 11/2004 | Miyake et al. |
| 6,840,843 B2 | 1/2005 | Jones et al. |
| 7,401,374 B2 * | 7/2008 | Tourigny ............... 15/104.001 |
| 2002/0131748 A1 | 9/2002 | Sato |

OTHER PUBLICATIONS

Written Opinion for PCT/US03/13083, mailed Mar. 12, 2004, 4 pages.

International Preliminary Examination Report for PCT/US03/13083, mailed Aug. 2, 2004, 7 pages.

* cited by examiner

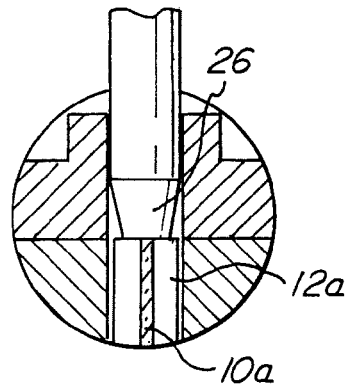 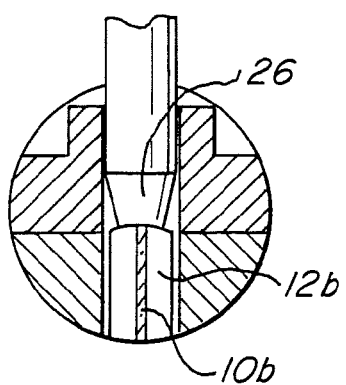 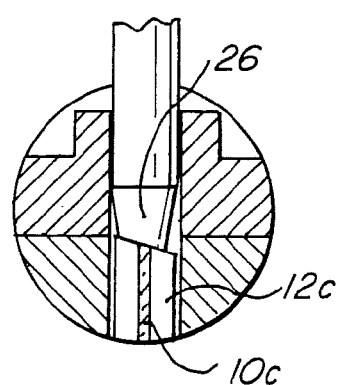
FIG. 7          FIG. 8          FIG. 9
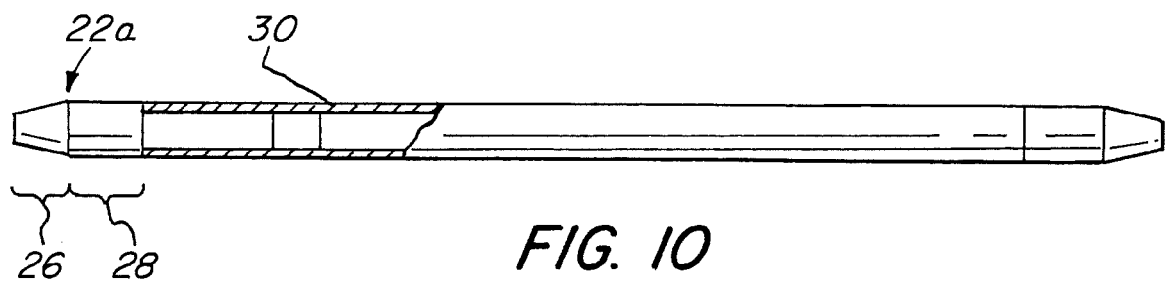
FIG. 10
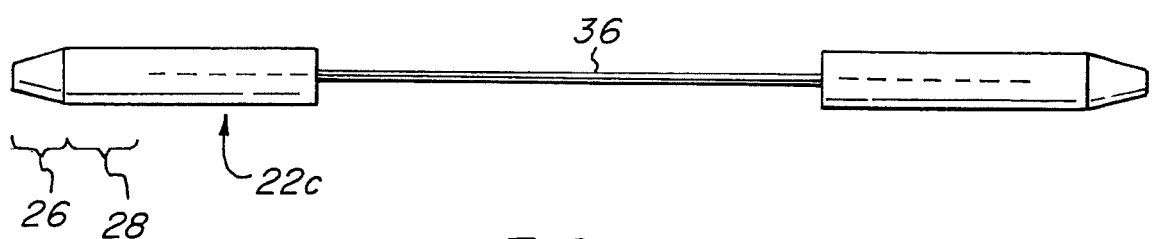
FIG. 11

ARTICLE FOR CLEANING OPTICAL FIBERS

CROSS-REFERENCE TO RELATED APPLICATIONS

This application is a divisional application of application Ser. No. 10/423,293 of Jay S. Tourigny entitled "Article For Cleaning Optical Fibers", filed on Apr. 25, 2003 now U.S. Pat. No. 7,401,374, which claims the benefit of U.S. provisional application Ser. No. 60/375,649 filed Apr. 26, 2002, entitled "Article For Cleaning Optical Fibers".

STATEMENT REGARDING FEDERALLY SPONSORED RESEARCH OR DEVELOPMENT

Not Applicable

REFERENCE TO A SEQUENCE LISTING

Not Applicable

BACKGROUND OF THE INVENTION

1. Field of the Invention

The present invention generally relates to cleaning devices for mechanically cleaning surfaces and, in particular, to devices for cleaning the ferrule end surface of an optical fiber which is installed in a ferrule connector such as a plug or a bulkhead for interconnection with another optical fiber or with an optoelectronic device.

In fiber optic networks, optical fiber strands, which typically have a diameter of about 8 micrometers, are connected by encasing the strands in protective jackets to form cables and butting two cable ends together. To do this, the ends of the individual fiber optic strands 10a, 10b, 10c (FIGS. 1A, 1B, 1C) are typically stripped of the jacket and are bonded and encased in the center of a rod-like ceramic ferrule 12a, 12b, 12c. This ferrule provides an enlarged surface area for finished polishing of the exposed end face of the optical fiber strand. The ferrules generally conform to standard sizes having end faces with diameters of 1.25 millimeters (mm), 1.6 mm, 2.0 mm or 2.5 mm. The ferrule end faces 14a, 14b, 14c (and the unnumbered end faces of the optical fibers therein) are polished either flat (FIG. 1A), slightly convex (FIG. 1B), or angled at approximately 8 degrees (FIG. 1C) to reduce reflected light when connected to another optical fiber. These ferrules are then fitted into variations of connector housings, e.g., connector 18 (FIG. 2), which precisely interconnect with similar devices, e.g., connector 18' (FIG. 3), via a coupler or bulkhead 20 to insure the exact alignment of the butted optical fiber strands. Cleanliness of cable connections is a critical factor in maintaining peak signal communication performance.

In spite of all the above preparations, these connections are highly susceptible to contamination at the abutting end faces of the optical fibers. Specifically, the optical transmission capability of the junction between the optical fibers can be significantly impaired by microscopically small deposits of contamination on the end surfaces of the fibers. Sources of such contamination include smoke, dust, dirt, moisture and other ambient contaminates; oils, salts and particles transferred from the skin of technicians during connector manufacture and assembly, cable installation, or job site service work. Small amounts of contamination in the form of particles or haze will significantly increase light attenuation across the butted connection. Therefore, it is essential that the end surfaces be cleaned before the optical fiber ends are connected to each other, and/or after they become contaminated during normal use.

2. Related Art

Prior art practice in the maintenance of optical fiber connectors is to rub the ferrule end against a fabric- or paper-based cleaning strip. This method requires that the ferrule end be fully exposed for proper cleaning, but this is often impractical because the ferrule end is often recessed within a connector or coupler and it would be necessary to disassemble the connector or coupler in order to clean the ferrule end. In these circumstances, the ferrule end is sometimes cleaned using a swab made of soft absorbent material(s) such as paper, fabric, foam or combinations of the three that is inserted into the connector or coupler and rotated along its axis to clean the ferrule end. Both the fabric strips and the swabs are often saturated in isopropyl alcohol as a cleaning solvent to assist the process. This method is flawed because swabs, by design, typically provide the best cleaning surfaces only along the outside diameter of the swab, i.e., on its sides, and not on the end. Thus, when inserted in the connector, coupler or bulkhead, the best cleaning performance will be along connector sidewalls, not where needed on the ferrule ends. In addition, adhesive and/or thermal bonding methods used to assemble the swab will often include or produce volatile compounds that are diffused during use and which contribute to the microscopic contamination of the ferrule end surface.

The contamination introduced by a prior art swab can be exacerbated when a cleaning solvent is used with the swab, because the solvent may dissolve and/or accelerate the physical decomposition of the bonding adhesives, urethane foams and other materials used to manufacture the swab. Finally, many prior art swabs use loose-stranded fibrous materials such as non-woven cotton or spunlaced polyester fabrics. These loose, non-woven strands tend to shed numerous particles that are larger than the 8-micrometer diameter of the fiber optic strand. The result is inadequate or incomplete cleaning of the ferrule end connection.

Thus, prior art cleaning methods and devices provide uneven cleaning performance.

SUMMARY OF THE INVENTION

This invention relates to a cleaning device comprising an open-celled structure having two ends and at least two density zones including a compression zone at one end and a sidewall cleaning zone adjacent to the compression zone, wherein the degree of consolidation of the compression zone is less than the degree of consolidation of the sidewall cleaning zone.

According to one aspect of the invention, the polymer density of the sidewall cleaning zone may be about from 10% to 50% greater than the polymer density of the compression zone.

According to one optional embodiment of this invention, the compression zone may have a pore volume of not more than 50%.

According to another aspect of this invention, the compression zone may have a pore volume that constitutes at least about 50% of the pore volume of the open-celled structure.

According to another aspect of the invention, the polymer density of the sidewall cleaning zone may be substantially uniform. Alternatively, the polymer density of the sidewall cleaning zone may exceed the density of the compression zone in a skin region of the sidewall cleaning zone.

According to still another aspect of this invention, the device may further comprise a base zone adjacent to the sidewall cleaning zone, wherein the density of the base zone is greater than the density of the sidewall cleaning zone.

Preferably, the open-celled structure is formed from sintered particles and/or stranded fibers of polymeric material.

Any of the foregoing embodiments may further comprise a handle secured to the end of the cleaning device opposite from the compression zone, which handle is preferably secured to the cleaning head by mechanical means.

Unless otherwise specified, the term "ferrule end face" is meant to include the end face of an optical fiber secured in the ferrule.

As used herein, the term "polymer density" means the proportion of the volume occupied by a given sintered polymeric structure (or portion thereof) that is occupied by solid polymeric material as opposed to the pores or open cells in that volume of the structure.

The phrase "degree of consolidation", as used herein to relate two portions or zones of a polymeric open-celled structure, refers to the polymer density of the zones and/or the extent to which the polymeric material in each zone has been sintered.

BRIEF DESCRIPTION OF THE DRAWINGS

FIGS. 7, 8 and 9 are partly cross-sectional views of the cleaning heads of FIGS. 4, 5 and 6 inserted into couplers in which ferrule ends are recessed, showing that the ends of the cleaning head conforms to the ferrule ends;

FIG. 10 is a partly cross-sectional elevation view of a cleaning device comprising two cleaning heads according to the present invention mounted on a tubular handle; and FIG. 11 is a partly cross-sectional elevation view of a cleaning device comprising two cleaning heads according to the present invention mounted on a stick handle.

DETAILED DESCRIPTION OF THE INVENTION AND PREFERRED EMBODIMENTS THEREOF

Figure 1A:
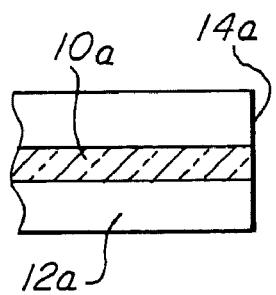
FIG. 1A is a cross-sectional view of a ferrule end with the end of an optical fiber therein, with a flat end surface according to the prior art.
Figure 1B:
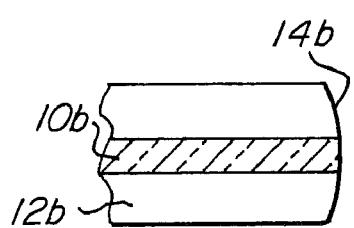
FIG. 1B is a cross-sectional view of a ferrule end with the end of an optical fiber therein, with a convex end surface according to the prior art.
Figure 1C:
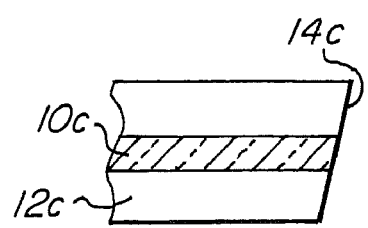
FIG. 1C is a cross-sectional view of a ferrule end with the end of an optical fiber therein, with an angled end surface according to the prior art.
Figure 2:
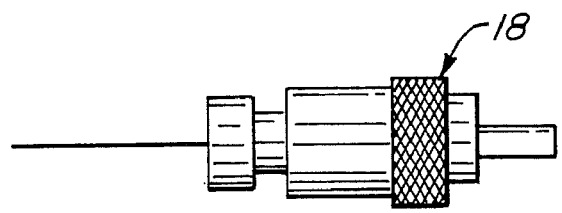
FIG. 2 is an elevation view of a connector fitting with a ferrule end therein according to the prior art.
Figure 3:
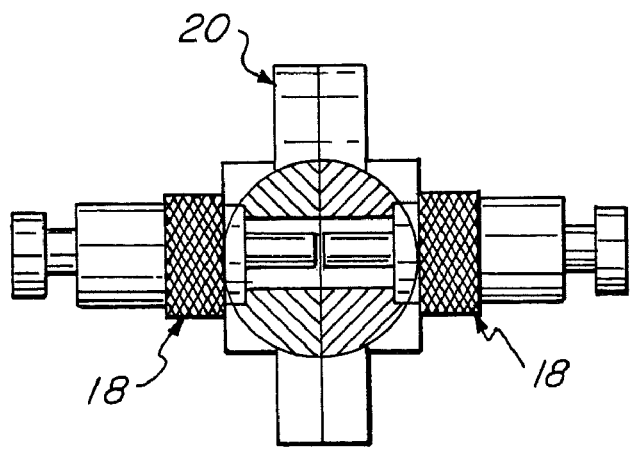
FIG. 3 is a partly cross-sectional view of two ferrule ends with optical fibers therein in a coupling to interconnect the optical fibers according to the prior art.

The present invention provides a device or article that is useful for cleaning contaminants and debris from surfaces. The cleaning device is made from discrete polymeric precursors, i.e., particles and/or fiber strands, that are sintered to form an open-celled structure ("sintered polymers"), either by being molded to a finished shape and then sintered, or by being sintered in an extruded bar or sheet or other bulk form, after which the bulk sintered polymer may be die cut and optionally further processed into the finished shape. In the preferred embodiment, a cleaning device according to this invention is configured in its finished shape as a cleaning head for cleaning the end of an optical fiber.

Sintered polymers provide dimensional stability to insure uniform cleaning performance and ease of manufacture and provide an inherent lubricity for the cleaning devices in which they are used. This allows ease of use in areas of tight tolerances and fit where prior art cleaning swabs normally bind or become shredded.

A cleaning head made from sintered polymers according to a preferred embodiment of this invention is configured for insertion into most kinds of optical fiber couplers and bulkhead fixtures and it has a cleaning end having an end face (the "contact area") that will conform to the shape of the ferrule end of the optical fiber to be cleaned. Such a cleaning head may be mounted on one or both ends of a handle, e.g., a tube or a shaft. The handle will facilitate manipulation of the cleaning head without the need to touch the cleaning head, thus avoiding contamination before use. The handle may itself be made from sintered polymer materials to increase overall absorption capabilities of the device, or from solid plastic, wood, metal or the like. The handle may also be further configured to permit use in automated equipment. In typical embodiments, a cleaning head according to this invention may be generally cylindrical and have a length of about one inch and a diameter of from 0.040 to 0.125 inch, so that it can easily be mounted on a handle at one end, and inserted into a standard ferrule connector at the other end.

Preferably, the cleaning head is secured to the handle by mechanical means rather than through the use of an adhesive. For example, the cleaning head may be configured for a friction fit with the handle, either for insertion of a cleaning head 22a within a tubular handle 30 (FIG. 10) or insertion of a shaft or stick handle 36 (FIG. 11) into an internal bore 34 (FIG. 6) in a cleaning head 22c. Optionally, there may be a physical connection such as a crimp or snap fit, or the handle and cleaning head may be joined by thermal or sonic welding or the like, or they may be formed together as an integral unit. These joinder techniques eliminate the need for a binder or adhesive to hold the cleaning head on the handle, and the absence of binders and adhesives (especially those that contain solvents), low molecular weight resins, etc., eliminates a potential source of contamination, especially when the cleaning head is used with cleaning solvents.

The cleaning head of this invention be used either dry or with various liquid cleaners. In addition, while excellent mechanical cleaning will occur on the cleaning surface, sintered polymers may also provide for liquid absorbency along the side of the cleaning head. This accelerates drying rates throughout the connector and bulkhead when a cleaning solvent is used with the cleaning head.

A cleaning device according to this invention is formed from sintered polymeric particles and/or fiber strands to yield an open-celled structure of a polymer matrix that defines multi-directional passages to lift, absorb and trap contamination on the surface to be cleaned, e.g., on a ferrule end of an optical fiber. The sintering process creates this structure through the use of fine polymeric particles and/or fiber strands that are randomly joined typically using heat, pressure and sometimes gas. Broadly speaking, the sintering process by which the cleaning heads of the present invention are made is similar to the sintering process used to manufacture nibs for marking pens, except that the cleaning heads of the present invention are designed by virtue of polymer density variations to facilitate solvent flow from the tip of the cleaning head into the body, whereas pen nibs carry solvent (and marking ink therein) from the body of the nib towards the tip.

A cleaning head according to this invention is a structure typically having an oblong configuration having two ends and at least two zones of different polymer densities, including a first zone or "compression zone" at one end and a second zone or "sidewall cleaning zone" adjacent the compression zone. The greater density of the sidewall cleaning zone relative to the density of the compression zone may be achieved in various ways. For example, greater density may be achieved by forming the sidewall cleaning zone from differently sized and/or more highly compressed particles and/or fiber strands. Alternatively (or in addition to other methods for increasing density), greater density may be achieved by sintering the polymeric material of the sidewall cleaning zone to a greater degree than the compression zone is sintered. Optionally, the additional sintering may be concentrated near the exterior surface(s) of the sidewall cleaning zone, to yield a dense skin or shell surrounding a sintered but less dense interior that may have about the same polymer density as the compression zone. Thus, the sidewall cleaning zone might be formed from the same precursor material and using the same process as is used for the compression zone, followed by additional sintering in the sidewall cleaning zone. The sintered skin may encompass about from one to two percent of the depth of the material in the sidewall cleaning zone. Alternatively, the sidewall cleaning zone may be substantially uniformly more sintered than the compression zone. Generally, the formation of a more sintered exterior (skin) is preferred for cleaning heads designed to clean the smaller diameter ferrule end faces.

In use, the compression zone makes contact with the optical fiber end face and has a lesser polymer density, i.e., it has a greater pore volume, than the sidewall cleaning zone. The polymer density of the sidewall compression zone is preferably about from 10% to 50% greater than the polymer density of the compression zone, the density difference between the two zones preferably being greater for cleaning heads for larger ferrule ends (e.g., 2.5 mm diameter) than for cleaning heads for smaller ferrule ends (e.g., 1.25 mm diameter). Typically, a smaller cleaning head is made with a compression zone that is more dense than the compression zone in a larger cleaning head. In addition, smaller cleaning heads preferably have sidewall cleaning zones whose density is increased over the compression zone by creating a sintered skin about the exterior of the sidewall cleaning zone as described herein.

Optionally, there may be a third zone of the cleaning head (e.g., a base zone) adjacent the sidewall compression zone (on the opposite side from the compression zone), and the third zone may be even more dense than the sidewall compression zone. The polymer density of the base zone may be about from 10% to 50% greater than the polymer density of the sidewall cleaning zone.

Overall, the pore volume of the compression zone may constitute at least about 50% of the pore volume of the cleaning head.

Figure 4:
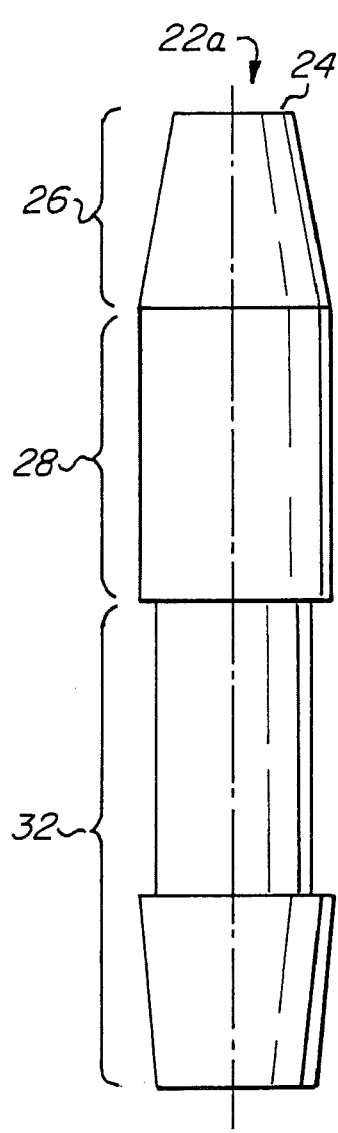
FIGS. 4, 5 and 6 are elevation views of cleaning heads made from sintered polymers in accordance with the present invention.
Figure 5:
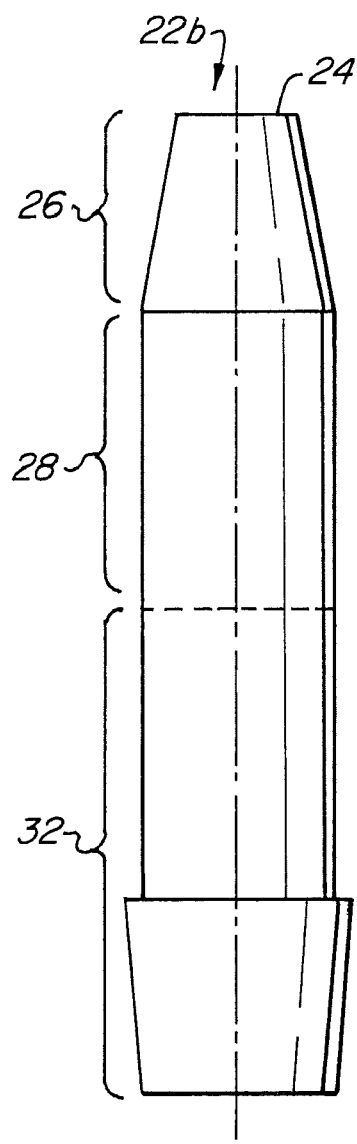
Figure 6:
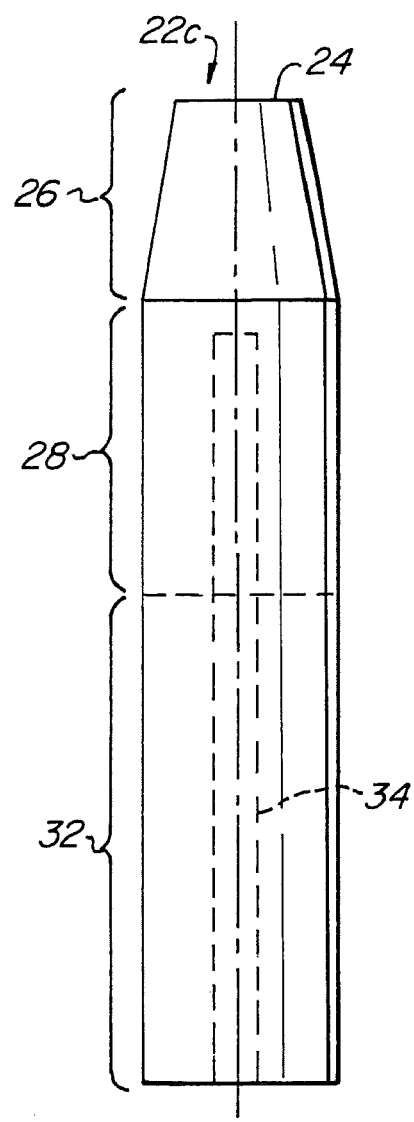

The preferred passage size (or "pore size") in the polymer matrix in the compression zone of a cleaning head according to this invention will typically be not greater than 50 micrometers, e.g., it may typically range from 10 to 42 micrometers, e.g., 30 micrometers. The polymer density of the compression zone may range about from 80% to 20%, which translates, conversely, to a pore volume of about from 20% to 80% of the overall matrix volume. In one embodiment, a 50% pore volume was found to be acceptable for cleaning an optical fiber having a diameter of about 2.5 millimeters. For smaller diameter fibers, lower pore volumes are preferred in order to maintain a requisite degree of stiffness. The cleaning head can be made by molding particles and/or fiber strands and then sintering them into a composition having the desired finished shape, or by forming a sintered polymer sheet, sintered polymer tube, or sintered polymer bar stock from which cleaning heads are formed by die cut stamping, slitting, machining or laminating. Typical cleaning heads 22a, 22b, 22c according to the present invention are depicted in FIGS. 4, 5 and 6, respectively.

The contact area 24 (FIG. 4) of the cleaning head 22a, 22b, 22c, i.e., the surface of the cleaning head that rubs on the end of the ferrule and the end of the optical fiber, is at the end of a portion of the cleaning head designated as the compression zone 26. The compression zone is designed to allow both radial deflection and lateral compressibility. This is done by employing low polymer density in the compression zone and, optionally, by tapering the end of the cleaning head with a bevel or chamfer. The reduced density of the compression zone leads to enhanced compressibility and insures full and uniform contact of the cleaning head across the entire face of the fiber optic ferrule regardless of the shape or position of the ferrule end, i.e., whether the ferrule end is flat, curved or angled, as shown in FIGS. 7, 8 and 9, respectively. Therefore, a cleaning head according to this invention can be made in a single configuration that is useful for cleaning optical fiber ends of a variety of shapes.

The reduced polymer density in the compression zone typically increases the elasticity of the open-celled multi-directional pore structure by 50% compared to the rest of the cleaning head. When an open-celled material such as the sintered polymer of this invention is compressed, air is squeezed out from the material. When the material is then allowed to relax, i.e., to expand back to its original condition, the previously compressed cells rapidly grow in volume, causing a reduction in air pressure therein that draws air (or another fluid, e.g., cleaning solvent) back into the cells. This enhances the material's ability to absorb. The greater pore volume of the compression zone relative to the rest of the cleaning head gives the compression zone greater physical capability to lift, absorb, trap and remove microscopic particulate contamination away from the surface of the ferrule end.

Reducing the polymer density in the compression zone also reduces the amount of force required to make the cleaning head conform to the ferrule end as described above. This force is typically applied in the same manner required to insert the cleaning head into a connector or coupler and is referred to herein as "insertion force". Conformance may also be facilitated by tapering the end of the cleaning head and/or by forming a bevel or chamfer thereon. Facilitating conformance, i.e., reducing the amount of insertion force used to achieve conformance, also reduces the chance that trapped contamination particles will scratch or otherwise damage the ferrule face during the cleaning procedure.

In one embodiment of this invention there is, adjacent the compression zone, a sidewall cleaning zone 28 (FIGS. 4, 5, 6) that is dimensioned to support the compression zone beyond the end of the handle on which the cleaning head is mounted (see FIGS. 10 and 11) so that the contact area can easily be inserted into an optical fiber connector, coupler or the like and touch the ferrule end face. The handle is mounted in a manner that leaves the contact area and, preferably, the compression zone and sidewall cleaning zone substantially unobstructed from contact with the optical fiber or the ferrule or coupler sidewalls. For example, the handle may be secured to the cleaning head at a region distant from the contact area, e.g., at the end of the cleaning head opposite from the compression zone (i.e., the "mounting end" of the cleaning head).

The density of the polymer particles in the sidewall cleaning zone 28 (FIGS. 4, 5, 6) is greater than in the compression zone 26, so the sidewall cleaning zone 28 provides extra strength, reduced compression and enhanced capillary absorption. The relatively increased density of the sidewall cleaning zone speeds liquid diffusion away from the optical fiber end face and into the body of the cleaning head. In addition, the sidewall cleaning zone 28 can contact the sidewalls of the coupler or bulkhead connector, removing contamination and absorbing liquids that would otherwise be trapped therein. It also allows the use of cleaning solvents to extend the cleaning head's capabilities to a broader range of contamination.

Adjacent the sidewall cleaning zone 28 there is an optional base zone 32 which is engineered with a higher density polymer structure than the sidewall cleaning zone 28. The base zone 32 thus provides even less compressibility and more strength than the sidewall cleaning zone 28 and facilitates attachment of the cleaning head 22a, 22b, 22c to handles to improve reach. This also improves the overall shear strength of the cleaning head 22a, 22b, 22c when it is inserted into bulkheads, which may use spring-actuated doors to prevent potential eye injury from stray laser reflections. These doors can inhibit cleaning by dragging against the cleaning head during use. The base zone 32 is also sized to act as a reservoir so that it contributes to the overall absorption capabilities of the cleaning head.

The various zones of the cleaning head of this invention can be formed in a single sintering step by loading different portions of a mold for the cleaning head with different sizes or densities of polymeric particles or fibers. The mold is then heated to sinter the polymeric precursors therein. An alternative method for achieving different densities is to use uniform polymeric precursors throughout and, in addition to the sintering for the compression zone, preferentially heat the sidewall cleaning portion of the mold so that a dense skin or shell is formed, thus increasing the density of that zone.

The cleaning head may either be used dry or in conjunction with a solvent for the kinds of oils that normally contaminate the ferrule ends. A preferred solvent is commercially available from E.I. Dupont de Nemours under the trade designation VERTREL CM, and it comprises a mixture of methanol, a fluorocarbon solvent known as HFC 4310 ($CF_3$—$(CHF)_2$—$(CF_2)_2$—$CF_3$) and a fluorocarbon solvent known as HFC 365 ($CF_3$—$CH_2$—$CF_2$—$CH_3$). When used, the solvent is preferably provided in a pump action spray bottle and it is sprayed onto the cleaning head before use.

A cleaning head made from one or more sintered polymers demonstrates excellent chemical stability and solvent resistance. Sintered polymers will not leach plasticizers, out gas vapors, or be effected by solvent contact. This assures the cleaning head does not contribute contamination or hazing to the fiber optic surface. Polymer types from which cleaning heads according to this invention may be prepared include polyethylene, polyacetal, polyolefin, polyester, high density polyethylene (HDPE), very high molecular weight polyethylene (VHMWPE), ultra high molecular weight polyethylene (UHMWPE), polytetrafluoroethylene (PTFE), nylon, polypropylene, polyvinyllidene fluoride (PVDF) and polyethersulfone (PES). Preferred polymers have glass transition temperatures between −30 and 225 degrees C., and the ratio between their melting points and their glass transition temperatures, expressed in degrees Kelvin, is between 1.2 and 2.55.

In one embodiment, a cleaning head in accordance with this invention is formed from sintered polyethylene and has a pore size in the compression zone in the range of 20 to 40 micrometers and a pore volume of 40 percent. It may be formed in the shape shown in FIG. 6 with a length of about 1 inch (i.e., 0.95±0.015 inch) and a diameter of about 0.1 inch that tapers at one end, over a distance of less than 0.1 inch, to a contact area having a diameter of about 0.8 inch. In one characterizing test, an axial force is applied to the end of such a cleaning head to press the contact area against a test surface, and the limits of deformation recovery and the amount of force are noted. This embodiment of the cleaning head will recover from deformation caused by pressing the contact area against a test surface disposed at a nine-degree angle relative thereto for 10 seconds and with a force of 113.5 grams (¼ pound). In another test, the stiffness of the cleaning head is measured by mounting the cleaning head in a fixture from which it extends for a distance of 0.4 inch and applying a lateral force at the distal end of the cleaning head and measuring the angle to which the extended portion deviates from its relaxed orientation. Under this test, a cleaning head according to this embodiment deflects at least 10 degrees.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. A cleaning device for cleaning an optical fiber, the device comprising:
   a cleaning head which is dimensioned and configured to be inserted into a standard ferrule connector for optical fibers and comprising a polymeric open-celled structure comprised of a coherent body of thermally sintered polymers, the coherent body having two ends, a first end and an opposite, second end, and at least two zones, the zones comprising a compression zone which terminates in a contact area at the first end of the cleaning head, and a sidewall cleaning zone adjacent to the compression zone, wherein the compression zone has a polymer density which is less than the polymer density of the sidewall cleaning zone.

2. The cleaning device of claim 1 wherein the polymer density of the sidewall cleaning zone is about 10% to 50% greater than the polymer density of the compression zone.

3. The cleaning device of claim 1 wherein the compression zone has a pore volume of not more than 50%.

4. The cleaning device of claim 1 wherein the compression zone has a pore volume that constitutes at least about 50% of the pore volume of the open-celled structure.

5. The cleaning device of claim 1 wherein the polymer density of the sidewall cleaning zone is substantially uniform.

6. The cleaning device of claim 1 wherein the polymer density of the sidewall cleaning zone exceeds the polymer density of the compression zone in a skin region of the sidewall cleaning zone.

7. The cleaning device of claim 1 further comprising a base zone adjacent to the sidewall cleaning zone and separated from the compression zone by the sidewall cleaning zone, wherein the polymer density of the base zone is greater than the polymer density of the sidewall cleaning zone.

8. The cleaning device of claim 1 wherein the open-celled structure is formed from one or both of thermally sintered particles and thermally sintered strands of polymeric material.

9. The cleaning device of claim 1 or claim 7 further comprising a handle secured to the end of the cleaning device opposite from the compression zone.

10. The cleaning device of claim 9 wherein the handle is secured to the cleaning device by mechanical means.

11. The cleaning device of claim 1 wherein the open-celled structure is comprised of thermally sintered fiber strands of polymeric material.

12. The cleaning device of claim 1 wherein the zones consist of one compression zone and one sidewall cleaning zone.

13. The cleaning device of claim 1 or claim 7 wherein at least the compression zone is tapered to have a diameter at the contact area which is less than its diameter adjacent the sidewall cleaning zone.

14. The cleaning device of claim 7 wherein the zones consist of one compression zone, one sidewall cleaning zone and one base zone.

15. The cleaning device of claim 1 or claim 7 wherein the compression zone terminates in a contact area and is tapered to have a diameter at the contact area which is less than its diameter adjacent the sidewall cleaning zone.

16. The cleaning device of claim 1 or claim 7 wherein the cleaning head consists essentially of thermally sintered particles.

17. The cleaning device of claim 1 or claim 7 wherein the cleaning head is cylindrical.

18. The cleaning device of claim 17 wherein the cleaning head is substantially circular in cross section.

19. The cleaning device of claim 1 or claim 7 wherein the cleaning head is cylindrical and has a diameter of from about 0.040 to about 0.125 inch.

20. The cleaning device of claim 19 wherein the cleaning head has a length of about one inch.

* * * * *